UNITED STATES PATENT OFFICE.

WILLIAM E. CARSON, OF RIVERTON, VIRGINIA.

CEMENTITIOUS COMPOSITION AND PROCESS OF MAKING THE SAME.

939,977.  Specification of Letters Patent.  Patented Nov. 16, 1909.

No Drawing.  Application filed February 19, 1909. Serial No. 478,976.

*To all whom it may concern:*

Be it known that I, WILLIAM E. CARSON, a citizen of the United States, residing at Riverton, in the county of Warren and State of Virginia, have invented certain new and useful Improvements in Cementitious Compositions and Processes of Making the Same, of which the following is a specification.

This invention relates to cementitious compositions and processes of making the same; and it comprises a composition containing a basic aluminate of calcium hydrated with water to a point short of complete hydration and setting; and it also comprises a method of producing such a composition embracing the steps of furnacing together a mixture of alumina or aluminum hydrate and in such proportions as to produce a composition containing more than three molecules of CaO per molecule of $Al_2O_3$, whereby a basic aluminate is produced and thereafter hydrating the composition with an amount of water sufficient to produce certain chemical reactions in such composition but insufficient to produce a complete hydration and setting; all as more fully hereinafter set forth and as claimed.

Alumina is capable of forming a plurality of compounds, or aluminates, with any of the oxids of the divalent metals, such as lime, baryta, strontia, magnesia, zinc oxid, etc., and a number of these compounds upon complete hydration with water set in much the manner of Portland cement. Portland cement as a matter of fact may be regarded as a composition of silicate of lime and aluminate of lime. With each of these basic oxids a number of distinct aluminates may be formed, the normal aluminates and those having a greater amount of alumina than corresponds to the normal aluminate being the more stable and well defined. The normal aluminate of lime, for instance, should contain an equal amount of oxygen in base and acid (or an oxygen ratio of 1:1); or, stated in another way, it should have 3 molecules of CaO for each molecule of $Al_2O_3$. The acid aluminates have less lime; having, for instance, 1 or 2 CaO to each $Al_2O_3$.

I have discovered that the basic aluminates having greater proportions of basic oxid to alumina than corresponds to the ratio 3:1 are useful components of various plastics. Basic calcium aluminates, for instance, have setting properties which depart from that of Portland cement and approach that of lime in a manner which in a way is proportional to the increase of ratio of the lime content to the alumina contained. These compositions upon partial hydration form various new bodies some of which may be directly produced. In co-pending application, Ser. No. 470,525, filed Jan. 2, 1909, I described the direct production of some of these hydrated basic compounds by mixing aluminium hydrate and quicklime together, and partially hydrating with limited amounts of water. This produces new and valuable ternary compounds of lime, alumina and water, which upon further additions of water will set to form hard materials suitable for plasters and like purposes. Such compositions may be usefully admixed with larger amounts of lime subsequent to their formation to produce still other plastics. Analogous compositions of useful properties may be obtained in another way, by igniting together mixtures of alumina and lime, or lime yielding substances, in such a ratio as to produce a basic, and preferably very basic, aluminate of lime. Upon a limited hydration of these products with water, dry, hydrated powders may be obtained which upon further additions of water will hydrate and set to form useful plastics. These plastics may be directly employed or may be used as a matrix in connection with the usual fillers, such as sand, rock powder, mica and other mineral aggregates. These basic calcium aluminates in admixture with lime, usefully modify the latter, producing an accelerated set and a harder composition. It is, however, usually as convenient to mix the necessary amount of lime with the alumina before furnacing in order to form a composition of the desired basicity rather than form a basic aluminate and afterward mix more lime with it. The results are also somewhat different. The more basic the composition formed in the firing the more easier and regularly the subsequent hydrating operations proceed and the more uniform is the product.

In producing the new composition any commercial form of alumina may be employed. Anhydrous alumina either natural or artificial is a relatively hard material, and is difficult to comminute and handle, while it requires a higher furnacing temperature in producing the desired composition, and the hydrated forms of alumina, such as the mineral bauxite are therefore preferable. The anhydrous forms of alumina may, however, be employed. Bauxite is cheap, convenient and eminently suitable for the present purposes, being easily comminuted, reacting easily with lime at furnace temperatures and needing less heating in forming the more basic aluminate. The alumina may be mixed with any convenient form of calcium compounds of such a nature as to permit the formation of aluminate on ignition or clinkering. The ground alumina or bauxite may for instance be mixed with the desired amount of quicklime or hydrated lime and passed through a rotary cement kiln as a traveling stream in the manner usual in forming Portland cement. Pulverized limestone, chalk, marl, shells, etc., may be used in lieu of the lime. Or the comminuted alumina or bauxite mixed with the comminuted calcareous composition may be formed into briquets and burned in an ordinary lime kiln.

At the high ignition temperatures the alumina combines with the lime, forming bodies having a greater ratio of CaO than that given by normal calcium aluminate, $Al_2O_3:CaO$. The product delivered from the kilns is ordinarily a body in appearance resembling an ordinary hydraulic lime, unless the temperature has been pushed so far as to approach a clinkering, fritting or sintering. Preferably, the temperature is not pushed so high as to produce this clinkering, since this involves additional labor in subsequent comminution. Clinkering, however, produces a good type of union between the lime and the alumina and a desirable product. The proportion of the alumina employed with the lime may be as desired, provided the ratio of CaO to $Al_2O_3$ is greater than 3:1. It is, however, better for most purposes to have the lime ratio considerably greater for the reason that a good composition for the present purposes need not contain more than 12 to 15 per cent. of alumina and may contain much less. These high-lime aluminates, furthermore, slake very much more readily than the aluminates which approach the normal 1:3 ratio, the ease of slaking being proportional to the excess of lime above this ratio. A composition containing about 12 per cent. of alumina is desirable for many purposes. It may be used alone as plastic material or it may be admixed with enough additional lime to bring the per cent. of alumina down to 4 or 5. This of course depends upon the use to which the composition is to be put. For a hard wall plaster, 4 to 6 parts of alumina to 94 parts of CaO in the ultimate product will make a good plastic. Where the plastic is to be used for purposes more analogous to cement, as for outside plaster, a higher ratio of alumina is better, say, up to 12-15 per cent. Whatever the ratio of alumina to lime in the composition, the composition may be employed as a matrix for sand in the same way as ordinary lime or cement, but with advantage over either for many purposes. As stated the lower the alumina contained the nearer the composition approaches lime, while with higher percentages of alumina the composition has more the qualities of cement, though in the latter case the likeness is not very close. Cement, for the present purposes, may be taken as being a mixture of aluminate and silicate of lime, without much if any free lime, while in the present invention there is an excess of lime. The reactions of silicate and aluminate of lime upon each other in the setting of cement are at present unknown but these bodies probably combine in some manner so that the resultant set plastic is probably a rather complex compound. In the present materials, the ultimate set plastic is of a different nature.

The alumina employed may contain a few per cent. of silica without material injury to the product but the per cent. of silica should not approach that which would give a composition like Portland cement. For this reason I do not advise the use of clays containing free alumina for furnishing alumina unless the proportions of such alumina is quite high. Such high-alumina clays may be employed however in some cases. The presence of more or less iron in the alumina is of little disadvantage save as to the color, since iron is a sesquioxid like alumina and has like properties in many respects. Compositions under the present invention may indeed be made by using ferric oxid in lieu of alumina. They are, however, heavy and dense and very dark colored, and are not advantageous save in relations where these properties are desirable. Chromium sesquioxid behaves like iron sesquioxid, but is too expensive for use save where a greenish plastic is desirable. The presence of more or less magnesia in the lime or limestone employed may be permitted, but is not advantageous. While magnesia forms compounds with these sesquioxids which are like in composition to those formed by lime, yet they do not slake as readily and it is difficult to produce the dry slaked compositions of the present invention without the use of artificial heat in beginning the slaking. In slaking the basic aluminate under the present invention, I have discovered that it is advantageous to allow a hot slaking in the beginning and afterward moderate the heat by artificial cooling. Taking a highly basic aluminate and slaking it under a continuous high temperature, the material loses part of its "fatness" on subsequent gaging with water. On the other hand, if the material be allowed to begin the slaking reaction at a high temperature and the temperature is afterward reduced, then upon mixing the finished dry powder with water in subsequent use, a "fatter" mixture is obtained. In the case of magnesian limes if employed in the present invention, it may be desirable to start the slaking of the basic aluminate with artificial heat. The same is often true with purer limes, where the quantity of alumina runs up to approach the tri-calcium aluminate.

A useful composition under the present invention may be made by mixing bauxite or other form of alumina with calcium carbonate in such a proportion as to have about 12 parts of $Al_2O_3$ present for every 88 parts of CaO. The bauxite and the calcium carbonate should be mixed to form a fine, uniform powder, being ground together or separately. The mixture may be passed through a rotary kiln in the manner usual in making cement. Or the mixture may be briqueted and burned in a lime kiln. The calcined material is next treated with a little less than the amount of water necessary to produce a complete hydration and a moist product which would set. With a fat lime used in producing the composition, the resultant hydrated product may be easily reduced to a fine, dry powder. Where the mixture has been made in the cement kiln and the temperature not pushed to the clinkering point, the material is pulverulent prior to hydration. In use upon mixing the dry hydrated powder with a further amount of water in amount sufficient to produce the ordinary mortar-like mass, further hydration ensues and the mass sets in a manner analogous to, but different from that of lime. Any desired amount of filler may be mixed with this mortar-like mass. With 3 or 4 parts of sand, the material forms an excellent plaster.

During the slaking, after the initial heating the temperature should be reduced. When this is done, the mortar-like composition formed may be directly mixed with sufficient lime to bring the percentage of alumina down to 4 or 5, this lime being preferably dry slaked, and well admixed. This forms a composition which can be gaged with water to form a plastic advantageous for many purposes.

Where the low-alumina composition is desired, however, it is better made directly in the kiln. For this purpose bauxite or other form of alumina is mixed with calcium carbonate, oxid or hydrate in proportion sufficient to give 4 or 5 parts of $Al_2O_3$ to 96 to 95 parts CaO and the mixture fired as before. The fired mass should be short-slaked with water in the manner described to form a hydrated, but unset, dry powder. During this hydration, a temperature-control is particularly useful. If the lime employed in this case and the preceding contains much magnesia the resultant composition may have to be heated to start the initial hydration, but the hydration should not be allowed to finish hot. The dry hydrated composition may be directly marketed, or it may be admixed with a suitable amount of sand, rock powder or other filler, producing a dry mixture ready for gaging with water to form a complete plaster or mortar. A composition of 1 part of the stated dry, hydrated basic aluminate with 4 or 5 parts of sand makes a good plaster or mortar. In calculating the composition of the material, 40 parts of MgO may be considered equivalent to 56 parts CaO and 160 parts $Fe_2O_3$ as equivalent to 102 parts of $Al_2O_3$.

As to the reactions which take place in treating the ignited mixture of alumina or bauxite and lime with water in amount insufficient to produce complete hydration and setting, I am unable to say. There appear to be specifically new bodies produced having useful cementitious properties. As to their nature I am unable to say, but they appear to be materially different from those which are produced in bringing together a mixture of aluminum hydrate, water and quicklime.

The usual hardening, accelerating, retarding, etc., agents such as glue, gelatin, carbohydrates, plaster of paris, borax and alkali sulfates may be employed in connection with the compositions of this invention. The complete set plastic may be treated with waterglass, alum solution, etc. Cement may also be used.

The basic calcium aluminates used in the present invention have the great advantage that they slake readily with water and at the same time with any excess of lime which may be present probably uniting more or less with this excess of lime prior to or during slaking. The acid calcium aluminates, on the other hand, slake relatively slowly, and when mixed with lime the lime slakes first, and the aluminate later, so that the basic compounds are not readily formed. Slaked lime once formed does not unite readily with bodies of this character. In such a compound the swelling and contraction are more or less indefinite since there are two bodies of different slaking periods and the acid aluminates are slower slaking in accordance with the degree of acidity. By forming basic aluminate in the mixture directly and then short slaking according to the described method, the body slakes as a whole giving a uniform product. On further additions of water as in gaging to form a plaster or mortar, a body of definite volume results and this body in place upon a wall or elsewhere does not again shrink and crack.

What I claim is:—

1. As a new composition of matter, a calcareous cementitious material comprising a directly produced basic aluminate of calcium hydrated to a point short of complete hydration and setting and forming a dry hydrated powder.

2. As a new composition of matter, a cementitious material comprising a directly produced combination of a basic oxid and a sesquioxid, the ratio of basic oxid to sesquioxid being greater than 3:1, said combination being hydrated to a point short of complete hydration and setting and forming a dry powder.

3. As a new composition of matter, a calcareous cementitious material comprising a directly combined composition of bauxite and lime, said composition being hydrated to a point short of complete hydration and setting subsequent to its formation, and said hydrated composition forming a dry powder.

4. The process of producing cementitious compositions which comprises igniting together a mixture of a material comprising a basic oxid and material comprising a sesquioxid, the ratio of the former oxid to the latter oxid being greater than 3:1, and subsequently hydrating to a point short of completion to form a dry cementitious mass.

5. The process of producing cementitious compositions which comprises igniting together a mixture of material comprising lime and alumina, the ratio of the lime to the alumina being greater than 3:1, and subsequently hydrating the product to a point short of complete hydration to form a dry cementitious mass.

6. The process of producing cementitious compositions which comprises igniting together a material comprising lime and bauxite, the ratio of such lime to the sesquioxids of the bauxite being greater than 3:1, and subsequently hydrating the product to a point short of complete hydration to form a dry cementitious mass.

In testimony whereof, I affix my signature in the presence of witnesses.

WILLIAM E. CARSON.

Witnesses:
  K. P. McElroy,
  S. V. Caffrey.